Oct. 7, 1941.                H. DAENDLIKER                2,258,110
                            ACCOUNTING MACHINE
                Filed Aug. 31, 1938            3 Sheets-Sheet 1

INVENTOR
Hansruedi Daendliker
BY
W. M. Wilson
ATTORNEY

Oct. 7, 1941.  H. DAENDLIKER  2,258,110
ACCOUNTING MACHINE
Filed Aug. 31, 1938   3 Sheets-Sheet 3

INVENTOR
Hansruedi Daendliker
BY
W. M. Wilson
ATTORNEY

Patented Oct. 7, 1941

2,258,110

UNITED STATES PATENT OFFICE 2,258,110

ACCOUNTING MACHINE

Hansruedi Daendliker, Winterthur, Switzerland, assignor to International Business Machines Corporation, New York, N. Y., a corporation of New York Application August 31, 1938, Serial No. 227,868

5 Claims. (Cl. 235—61.8)

This invention relates to accounting machines and more particularly to machines controlled by perforated record cards called "tabulating cards" in which the perforations are made in such manner that the positions of the perforations indicate numerical or other data.

The invention resides more particularly in the provision of control devices in an electrically controlled accounting machine for the handling of record cards in which perforations represent money values, particularly cents. Frequently, such amounts are recorded on the record cards to represent the cents and mills and in adding together such values the mills are disregarded if less than a half cent, and taken into account as the whole cent if equal to 5 or more mills.

The main object of the present invention is to provide for the handling of this so-called "half cent pick-up" particularly where subtracting operations are involved. As subtraction is carried out in accounting machines, two accumulators are usually provided, and are known as the "credit balance" accumulator and the "debit balance" accumulator. The first accumulator receives all credit amounts and complements of debit amounts, while the latter receives all debit amounts and complements of credit amounts. Where the values to be accumulated contain mills, the machine must take into account whether the amount entered is a credit or debit amount and also the magnitude of the value of the mills in order to effect the proper entries into the two accumulators.

Further objects of the instant invention reside in any novel feature of construction or operation or novel combination of parts present in the embodiment of the invention described and shown in the accompanying drawings.

In the drawings:

Figs. 1 and 1a taken together and placed one above the other represent a wiring diagram of the necessary circuit connections for carrying out the invention.

Fig. 4 is a detail of the tens carry mechanism for entering an additional unit into the accumulators.

The invention is shown as applied to a machine illustrated and described in Patent 1,976,617, granted to C. D. Lake and G. F. Daly on October 9, 1934. In the machine of this patent there are provided two analyzing or sensing stations past which record cards are advanced in succession. The first station is known as the control or upper brush station which effects a preliminary sensing of the record card to set up the various control conditions, so that as the card subsequently passes the lower brush or adding control station, the perforations in the card will control adding operations according to the conditions established.

Figure 5:
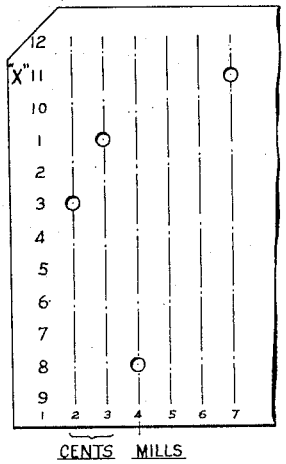
Fig. 5 is a fragment of the record card perforated in accordance with a selected value.

In accordance with the present invention, record cards such as shown in Fig. 5 are fed through the machine. In these cards amounts are perforated in the columns labeled "cents" and "mills" to represent money values and a special perforation in the X or 11 index point position in a further column is made where the amount represents a debit or subtractive amount. For credit amounts, the special X perforation is omitted. As such cards pass the upper sensing station, the mills column is sensed and by means of devices to be described a determination is made to discover whether the position perforated in this column is to be considered as a whole cent or disregarded. At the same time, the column in which the X perforation is made is sensed to determine the characteristic of the card.

Before describing the detailed mechanism, the general operation will be explained in connection with Fig. 2 in which four accumulators Nos. 2, 3, 4, and 5, are represented. Accumulators 4 and 5 are identified as the "credit balance" and "debit balance" accumulators respectively. Into the former are entered all credit amounts and complements of debit amounts, and into the latter are entered the complements of credit amounts and all debit amounts in their true values. The machine is arranged to selectively enter the value "ten" into a selected order of either accumulator 2 or accumulator 3, and provision is made for causing the entry of this amount in accumulator 3 to effect an entry of 1 in the units order of accumulator #5 through 10's carry mechanism and in the same manner an entry of 10 in accumulator #2 will cause a unit entry to be made into the credit balance accumulator #4. Thus, a card having a credit entry of 563 representing 56 cents and 3 mills will cause an entry of 56 in accumulator #4, and the entry of its 9's complement 9943 into accumulator #5. At the same time, a 10 is entered into accumulator #3, so that during the carry portion of the entering cycle of operations an additional unit is entered into accumulator #5 to bring the complement to the 10's complement of 56.

Where the credit entry contains five or more mills as for the card entry 567, the entries into accumulators #4 and #5 are the same as before, except that the entry of 10 is made into accumulator #2 and the unit is carried into accumulator #4 bringing the true amount entered therein to 57 and leaving the initial entry of the 9's complement of 56 undisturbed, so that in effect the two entries represent the original value of the cents increased by 1 and the 10's complement thereof.

The next card represents a debit amount 314. In this case the entry is reversed to enter the true cents amount 31 in accumulator #5 and its 9's complement 9968 in accumulator #4. At the same time, a 10 is entered into accumulator #2 so that it carries 1 into accumulator #4 to obtain the proper 10's complement in that accumulator. Finally, for a card having a debit amount 318, the 10 is entered in accumulator #3 so that through the carry the true amount is raised 1 unit and the initially entered 9's complement of 31 now represents the 10's complement of 32.

The details of construction and operation of the tabulating machine are not specifically set forth herein, as they are the same as fully described in the patent referred to, and in the subsequent description where parts corresponding to those of the patent are described the same reference characters will be used to facilitate an understanding of the same in connection with the patent. Where mechanisms or circuits are provided to carry out the present invention, the reference characters applied thereto will begin at 500.

Referring to Fig. 4, the units order of each of the subtracting accumulators of the patent has associated therewith a magnet 148 whose armature 149 is secured to the carry lever latch 104 of the units order, so that energization of magnet 148 will trip the units pawl carrying arm 102, whereby, during the carrying portion of the machine cycle the pawl 100 associated with the units order will advance the units wheel one step. For the purposes of the present invention, the highest order pawl carrying arm 102 of accumulators #2 and #3 have connected thereto a rod 500 whose other end abuts against a pair of contacts 501. When the wheel 83 in such highest order passes through 0 position, a high tooth of its carry cam 99 will engage and rock a pawl 100 which through an extension 103 thereon will rock a spring-pressed latch 104 downwardly to release member 102. Releasing the member 102 in this manner will permit a spring 105 connected at its upper end to rock the same in a clockwise direction and in so doing, rod 500 will be moved toward the right to close contacts 501.

Before placing the machine in operation, certain preliminary plug connections are made which will first be described. The upper brush UB (Fig. 1) which traverses the column in which mills perforations are made has its plug socket 301 connected by a plug connection 502 to a plug socket 503. The brush UB which traverses the column in which the X perforation is made has its socket 301 connected by a plug connection 504 to plug socket labeled X1 of the machine. The lower brushes which traverse the two cents columns of the record card (see Fig. 1a) have their plug sockets 300 connected by plug connections 505 to plug sockets 302 of accumulator #4, and these in turn are connected by plug connections 506 to the correspondingly ordered sockets 302 of accumulator #5. A plug connection 507 (Fig. 1) is made between sockets 415 of accumulator #4 and sockets 418 of accumulator #5 and a further connection 598 is made between sockets 418 of the accumulator #4 and 415 of accumulator #5. These connections, as will be explained, cause one accumulator to add, while the other subtracts and vice versa.

Figure 3:
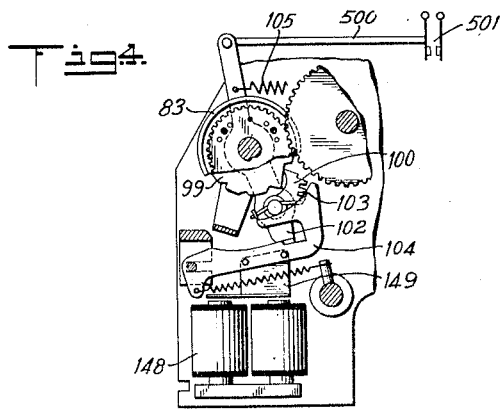
Fig. 3 is a timing chart of certain of the electrical contact devices.

The plug socket 503 (Fig. 1) is electrically connected to a commutator brush 509 which traverses commutator segments 510 of a fixed commutator. Each of the segments is connected by a wire 511 to one of a number of plug sockets 512. The brush 509 is suitably geared to the machine, as by connection to the shaft in Fig. 3 of Patent 1,976,617 on which commutator cam 60 is mounted, so that during its rotation it contacts the segments 510 in the order 9, 8, 7, etc. as the correspondingly numbered index point positions in the record are sensed by the brushes UB. The sockets 512 numbered 5—9 inclusive are connected together by plug connections 513 and one of such sockets is connected by a connection 514 to a plug socket 515.

As the card moves past the upper brushes, the presence of perforations in any of the positions 9—5 will cause a circuit to be completed which is traceable from left side of line 334 to cam contacts L11, upper brush common 55, brush UB traversing the mills column, its socket 301, connection 502, socket 503, one of the segments 510 numbered 9—5, wire 511 to the corresponding socket 512, connections 513 and 514, socket 515, relay magnets 516 and 517 in parallel, contacts UCLa to right side of line 335. Relay 516 closes its contacts 516a providing a holding circuit from line 334, cam contacts L25, contact 516a, relays 516 and 517 in parallel, contacts UCLa, to line 335. This circuit will be held by contacts L25 until near the end of the cycle. Thus, whenever a mills perforation of 5 or more is present, magnets 516 and 517 will be energized and held for the remainder of the cycle.

If an X perforation is present, a circuit is traceable from line 334, contacts L11, common 55, brush UB, socket 301, plug connection 504, socket X1, cam contacts L18 which close at the X time, relay magnets 423 and 424 in parallel, contacts UCLa to line 335. Contacts 424a close to provide a holding circuit through cam contacts L25. Thus, as the card passes the upper brushes, a combination of conditions is established. For example, neither of the relays 517 or 423 may be energized, both may be energized or either may be energized alone.

For each of the accumulators there is provided a magnet 393 and a magnet 395. When the former is energized, the accumulator will add; when the latter is energized, the accumulator will subtract, subtraction being performed by initially tripping all the adding magnets at the 9 time to enter 9 in all orders, and disengaging when a perforation is sensed, thus in effect adding the 9's complement of the number sensed, into the accumulator. In the machine of the patent, an additional 1 is invariably entered into the units order of the accumulator to raise the 9 complement to a 10's complement. In the present case the entry of this additional unit is controlled selectively in accordance with the conditions set up by the card as it traverses the upper brushes.

Figure 1:
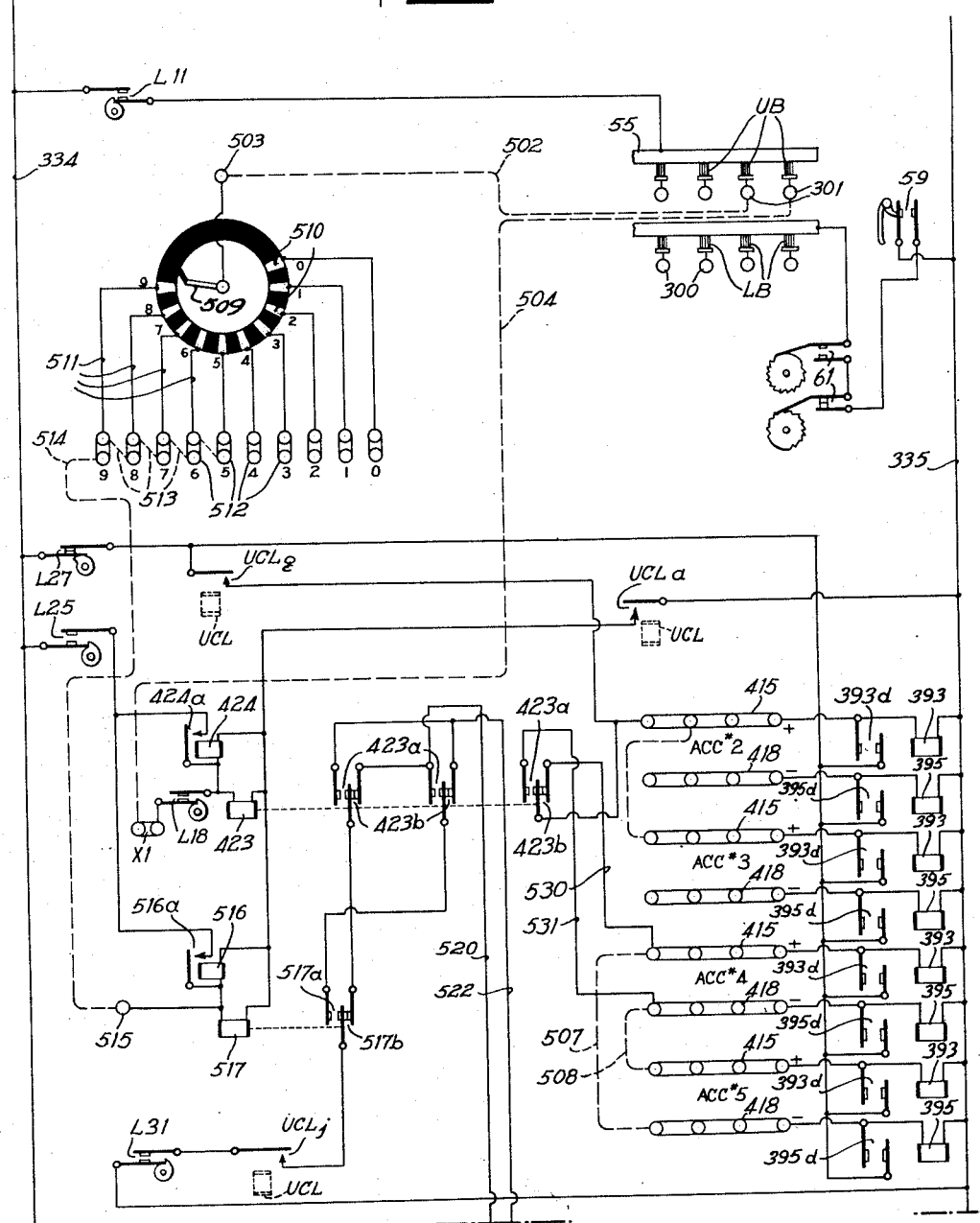
Figure 1A:
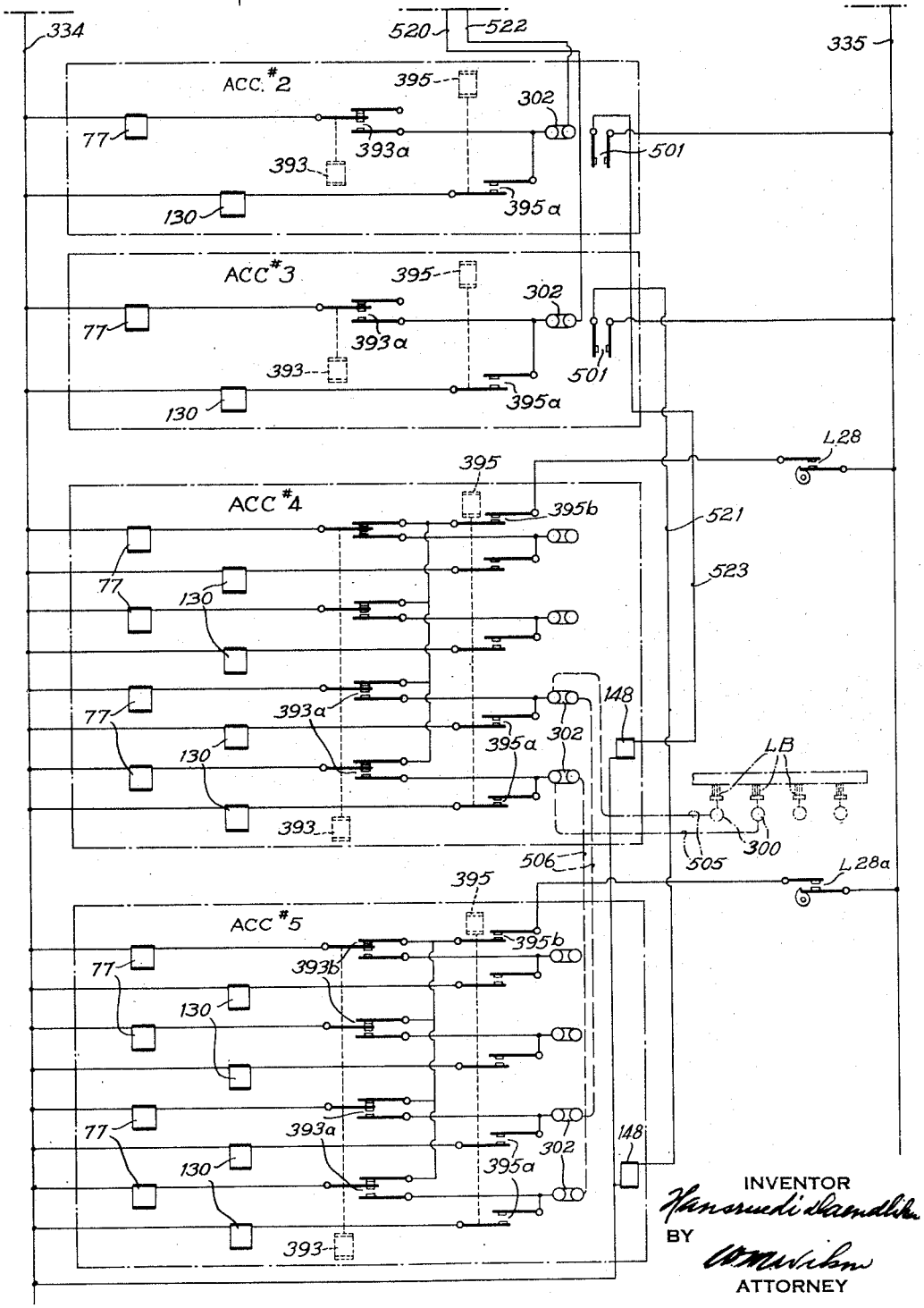

Referring to Fig. 1, for each cycle a circuit is traceable from line 334 through cam contacts L27, contacts UCLg to plug sockets 415 of accumulators #2 and #3, and thence through magnets 393 of these accumulators to line 335. These magnets close their contacts 393d to provide holding circuits for the magnets throughout the entering portion of the cycle and these holding circuits short-circuit contacts UCLg to take the relatively heavy current therefrom. The effect of this is to condition these two accumulators to always add.

When relay magnet 423 is deenergized, a circuit is traceable each cycle from line 334 through contacts L27, UCLg, right hand pair of contacts 423b, wire 530 to plug sockets 415 of accumulator #4, and magnet 393 to line 335. A parallel circuit extends through connection 507 to plug socket 418 of accumulator #5 and magnet 395 to line 335. Thus, when no X hole is present in the card, accumulator #4 is conditioned to add and accumulator #5 is conditioned to subtract. When an X hole is present, magnet 423 becomes energized, as explained, so that its left hand contacts 423a are closed and its contacts 423b open so that the circuit conditions are reversed to go through contacts 423a and wire 531, resulting in the energization of magnet 395 of accumulator #4 and magnet 393 of accumulator #5, whereby accumulator #4 will be conditioned to subtract and accumulator #5 conditioned to add.

Figure 2:
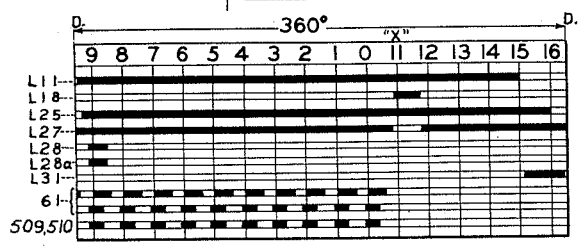
Fig. 2 is a diagram showing the sequence of operations involved in entering amounts of different characteristics.

With an understanding had of the manner in which the accumulators function as explained in Patent 1,976,617 together with the explanation of the preliminary setting of the relays 423 and 517, the operation thereof in handling problems according to the present invention may now be best explained by tracing through the operation with reference to the particular conditions outlined in Fig. 2.

Assume first that a card containing the credit entry of 563 traverses the upper and lower brushes in succession. In this case, neither of the magnets 423 and 517 is energized. Near the end of the cycle during which the card passes the upper brushes a pair of cam contacts L31 (Fig. 1) close and complete a circuit traceable from line 335, contacts L31, card lever relay contacts UCLj, contacts 517b, 423b, wire 520, (Fig. 1a) to socket 302 of the highest order of accumulator #3, thence through contacts 393a, which are now closed due to the additive condition of the accumulator, to adding magnet 77, thence to line 334. Contacts L31 and UCLj are provided for the purposes of the present invention and by energizing the adding magnet at this time, cause tripping of the entering mechanism so that the accumulating wheel will advance a complete revolution during the next following cycle. In this next cycle the card traverses the lower brushes LB and at the beginning of this cycle cam contacts L28a (Fig. 1a) close to complete a circuit from line 335, L28a, contacts 395b, closed due to the subtracting condition of accumulator #5 and thence through all the normally closed contacts 393b and all the adding magnets 77 of this accumulator. When the perforation reaches the lower brushes, a circuit is completed from the lower brush sockets 300 through connections 505, 506, to plug sockets 302 of accumulator #5, thence through the now closed contacts 395a, to the subtracting magnet 130 and thence to line 334. Energization of this magnet disengages the adding clutch to position the accumulator orders in accordance with the 9's complement. Concurrently, the true value sensed by the lower brushes is entered into accumulator #4 through circuits from the lower brush sockets 300, connections 505, sockets 302 of accumulator #4, contacts 393a which are now closed, and the adding magnets 77 to line 334. Thus, before the carrying portion of the cycle during which the card passes the lower brushes, the 10 is entered in the highest order wheel of accumulator #3 causing closure of its carry contacts 501. The amount 56 is entered in accumulator #4, and the 9's complement 9943 is entered in accumulator #5. Closure of contacts 501 completes a circuit from line 335 through contacts 501 of accumulator #3 to wire 521, carry magnet 148 of accumulator #5, tripping the carry lever of the units order so that during the carry portion of the cycle, an additional unit is entered in this order, raising the amount therein to 9944, the 10's complement of 56.

Assume now that the credit card having the value 567 passes the brushes. As this card passes the upper brushes, it causes energization of relay magnet 517 causing closure of its contacts 517a and opening of its contacts 517b, so that now when cam contacts L31 close, the circuit runs from these contacts through contacts 517a, contacts 423b of the center set of contacts and through wire 522 (Fig. 1a) to socket 302 of accumulator #2, thence through contacts 393a (now closed) and the adding magnet 77 to line 334. In this manner, the highest order of accumulator #2 receives the entry of 10 instead of accumulator #3. The further operations as the card passes the lower brushes are the same as for the preceding card, except that the additional unit entry during the carry portion of the cycle is through contacts 501 of accumulator #2 and thence through wire 523 to the carry magnet 148 associated with the units order of accumulator #4 thereby raising the true amount 56 to 57 and leaving the 9's complement 9943 in accumulator #5 undisturbed.

Assume now the condition for the third card of Fig. 2 as having a debit entry of 314. In this case, as the card passes the upper brushes, relay magnet 423 alone is energized. This magnet, by shifting its right hand contacts 423a, 423b, reverses the entering condition of the accumulators #4 and #5 as explained, so that the latter receives the true entry and the former receives the 9's complement. Under this condition, when L31 closes, the circuit is traceable from these contacts through contacts 517b, contacts 423a of the left hand set of contacts, thence through wire 522 to enter the 10 in accumulator #2. Therefore, as already traced, the additional unit is entered into the units order of accumulator #4 to raise the 9's complement to a 10's complement.

Finally, for the fourth condition where a card having a negative amount 318 passes the brushes, both relays 423 and 517 are energized and under this condition the circuit from contacts L31 follows through contacts 517a, the center contacts 423a, and wire 520 to cause an entry of 10 to be made in accumulator #3, so that during the carry portion of the adding cycle, the additional unit is entered into the units order of accumulator #5 raising the true entry therein from 31 to 32.

It will be noted in Fig. 1 that due to the provision of the plug sockets 512 relay 517 may be picked up in response to the sensing of any predetermined value or values in a selected column, so that the selective entry of the additional unit is not restricted to a half cent but may be a different fractional part of a cent.

While there has been shown and described and pointed out the fundamental novel features of the invention as applied to a single modification, it will be understood that various omissions and substitutions and changes in the form and details of the device illustrated and in its operation may be made by those skilled in the art without departing from the spirit of the invention. It is the intention therefore to be limited only as indicated by the scope of the following claims.

What is claimed is:

1. In a machine controlled by record cards containing perforations representing debit and credit amounts expressed in cents and mills and a designation for distinguishing debit and credit amounts, said machine having means for sensing the cents part of the amounts, means for sensing the distinguishing designation, a pair of accumulators, entering means for each, controlled by both said sensing means to enter the cents part of credit amounts and the nines complements of debit amounts into one accumulator and the cents part of debit amounts and the nines complements of credit amounts into the other accumulator, and each accumulator having a device for entering an elusive one therein; in combination with means for sensing the mills part of the amounts, testing means controlled by said mills sensing means for ascertaining whether the mills part is greater than a predetermined digit, means controlled jointly by said testing means and said designation sensing means for selecting for operation one or the other of said elusive one entering devices to enter an elusive one into said one of the accumulators when the amount sensed is a credit amount and the mills part is greater than the predetermined digit, or when the amount sensed is a debit amount and the mills part is less than the predetermined digit, and into the said other accumulator when the amount sensed is a credit amount and the mills part is less than the predetermined digit, or when the amount sensed is a debit amount and the mills part is greater than the predetermined digit and means for operating the selected device.

2. In a machine controlled by record cards containing perforations representing debit and credit amounts expressed in cents and mills and a designation for distinguishing debit and credit amounts, said machine having means for sensing the cents part of the amounts, means for sensing the distinguishing designation, a pair of accumulators, entering means for each, controlled by both said sensing means to enter the cents part of credit amounts and the nines complements of debit amounts into one accumulator and the cents part of debit amounts and the nines complements of credit amounts into the other accumulator, and each accumulator having a device for entering an elusive one therein; in combination with means settable in accordance with a predetermined digital value, means for sensing the mills part of the amounts, means operative under control of said settable means and said mills sensing means when the mills digit sensed is greated than the predetermined digital value, and further means controlled by said last named means and said designation sensing means when the mills digit is greater and when a credit amount is sensed, for causing the operation of the elusive one entering device related to the accumulator which receives the credit amounts and nines complements of debit amounts, to cause an elusive one to be entered therein.

3. In a machine controlled by records containing perforations representing debit and credit amounts expressed in cents and mills and a designation for distinguishing debit and credit amounts, said machine having means for sensing the cents part of the amounts, means for sensing the distinguishing designation, a pair of accumulators, entering means for each, controlled by both said sensing means to enter the cents part of credit amounts and the nines complements of debit amounts into one accumulator and the cents part of debit amounts and the nines complements of credit amounts into the other accumulator, an elusive one entering device for each accumulator, and means normally operative under control of said designation sensing means to render either elusive one entering device effective to enter an elusive one in accompaniment with each nines complement entered in the related accumulator, in combination with means for sensing the mills part of the amounts, testing means controlled thereby for ascertaining whether the mills part is greater than a predetermined digit and means controlled by said testing means when the mills part is greater than the predetermined digit for suppressing the normal operation of said elusive one entering means and causing the elusive one to be entered into the accumulator other than that into which the nines complement is entered.

4. In an accounting machine having means for sensing a column of a record card for perforations representing a digit, means for sensing a column of a record card for a special perforation distinguishing negative and positive characteristics of the digit, a pair of accumulators and elusive one entering means for each, in combination with testing means controlled by said first named sensing means for ascertaining whether the digit sensed is greater than a predetermined digit and means controlled jointly by said testing means and said second sensing means, when the digit sensed is greater than the predetermined digit and positive or less than the predetermined digit and negative, for causing an operation of the elusive one entering means of one of said accumulators and, when the digit sensed is greater than the predetermined digit and negative or less than the predetermined digit and positive, for causing an operation of the elusive one entering means of the other of said accumulators.

5. In an accounting machine controlled by a record card containing perforations representing an amount of at least two denominational orders having means for sensing the perforations representing a predetermined order of the amount, means for sensing the perforations representing the higher orders, a pair of accumulators, entering means for each, means controlled by the second named sensing means for controlling said entering means to effect entry of the digits of said higher orders into one accumulator and the nines complements of said digits into the other accumulator, elusive one entering means for each accumulator, and means normally effective for causing the elusive one entering means of the accumulator receiving the nines complement to enter an elusive one therein, in combination with means controlled by said first named sensing means for ascertaining whether the digit in said predetermined order is greater than a predetermined digit and means controlled thereby for suppressing the operation of the elusive one entering means of the nines complement accumulator and causing an operation of the elusive one entering means for the other accumulator.

HANSRUEDI DAENDLIKER.